(12) United States Patent
Gigushinski et al.

(10) Patent No.: US 8,577,186 B1
(45) Date of Patent: Nov. 5, 2013

(54) FORWARD INTERPOLATION APPROACH USING FORWARD AND BACKWARD MAPPING

(75) Inventors: Oded Gigushinski, Tel Aviv (IL); Shahar Kovalsky, Tel Aviv (IL); Noy Cohen, Tel Aviv (IL); Yariv Oz, Tel Aviv (IL); Daniel Cohen, Tel Aviv (IL); Poitr Stec, Galway (IE); Alexandru Drimbarean, Galway (IE)

(73) Assignee: DigitalOptics Corporation Europe Limited, Ballybrit, Galway (IE)

( * ) Notice: Subject to any disclaimer, the term of this patent is extended or adjusted under 35 U.S.C. 154(b) by 57 days.

(21) Appl. No.: 13/027,175

(22) Filed: Feb. 14, 2011

(51) Int. Cl.
*G06K 9/40* (2006.01)

(52) U.S. Cl.
USPC .......................................... 382/300; 382/275

(58) Field of Classification Search
USPC ................................................. 382/275, 300
See application file for complete search history.

(56) References Cited

U.S. PATENT DOCUMENTS

| | | | |
|---|---|---|---|
| 4,714,428 A | 12/1987 | Bunker et al. | |
| 5,051,734 A * | 9/1991 | Lake, Jr. | 345/568 |
| 5,276,519 A | 1/1994 | Richards et al. | |
| 5,489,940 A * | 2/1996 | Richardson et al. | 348/315 |
| 5,675,380 A * | 10/1997 | Florent et al. | 348/251 |
| 6,487,309 B1 | 11/2002 | Chen | |
| 6,707,998 B2 | 3/2004 | Gallagher | |
| 6,738,057 B1 * | 5/2004 | Campbell | 345/611 |
| 7,072,528 B2 * | 7/2006 | Han | 382/300 |
| 7,596,286 B2 | 9/2009 | Nose et al. | |
| 8,145,007 B2 * | 3/2012 | Davey et al. | 382/274 |
| 2002/0085770 A1 | 7/2002 | Han | |
| 2002/0164083 A1 | 11/2002 | Song et al. | |
| 2003/0179950 A1 | 9/2003 | Komura et al. | |
| 2005/0007477 A1 * | 1/2005 | Ahiska | 348/335 |
| 2009/0154822 A1 * | 6/2009 | Cabral et al. | 382/255 |
| 2010/0182510 A1 * | 7/2010 | Gerkmann et al. | 348/607 |

FOREIGN PATENT DOCUMENTS

WO WO2010071647 A1 6/2010

OTHER PUBLICATIONS

An architecture for—FPGA, Sungchan et al., SPIE 0277-786X, 2008, pp. 1-9.*

* cited by examiner

*Primary Examiner* — Jayesh A Patel
(74) *Attorney, Agent, or Firm* — Hickman Palermo Truong Becker Bingham Wong LLP

(57) ABSTRACT

A forward interpolation approach is disclosed for enabling a second version of an image to be constructed from a first version of the image. According to one implementation, an input pixel from the first version of the image is forward mapped to the second version of the image to determine a set of candidate pixels that may be affected by the input pixel. Each candidate pixel is then backward mapped to the first version of the image to determine whether they are actually affected by the input pixel. For each candidate pixel that is actually affected by the input pixel, a pixel value is determined for that candidate pixel based at least in part upon the pixel value of the input pixel. By using this forward and backward mapping technique, forward interpolation can be implemented quickly and efficiently.

42 Claims, 8 Drawing Sheets

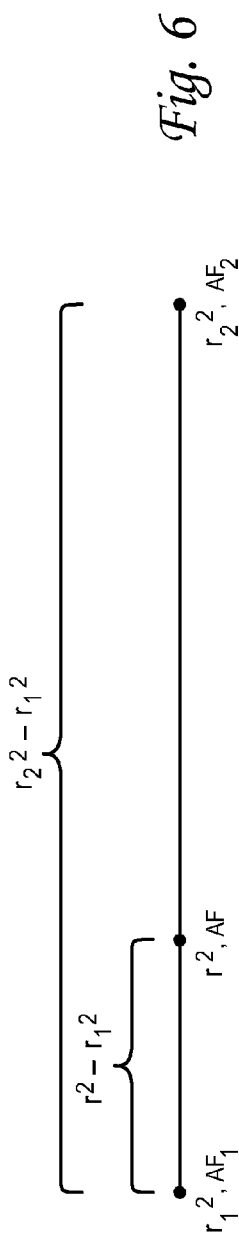

FORWARD INTERPOLATION APPROACH USING FORWARD AND BACKWARD MAPPING

BACKGROUND

The approaches described in this section are approaches that could be pursued, but are not necessarily approaches that have been previously conceived or pursued. Therefore, unless otherwise indicated, it should not be assumed that any of the approaches described in this section qualify as prior art merely by virtue of their inclusion in this section.

Some digital cameras are able to produce digital images at varying desired levels of zoom without the need for expensive and failure-prone mechanisms that physically move the lens closer to or farther away from the camera's sensor array; the lens may remain stationary. An example technique for achieving optical zoom using a stationary lens system that captures a distorted image is described in PCT Patent Application PCT/IB2007/004278, Publication No. WO 2008/152441 A2, filed on Sep. 14, 2007, titled "IMAGING SYSTEM FOR IMPROVED IMAGE QUALITY AND ASSOCIATED METHODS," the contents of which are incorporated herein by reference.

Generally speaking, the stationary-lens zoom feature may be accomplished through the use of a system of lenses that capture a radially distorted image, in which the central portions of the distorted image are more magnified (and therefore more detailed) than are the portions along the distorted image's periphery. The radially distorted image may be, but does not necessarily need to be, an image that is produced via a fisheye-like distortion. Whereas normal high-quality lenses might naturally produce a maximum distortion of less than 2% in portions of the captured image, the lens system used in the distorted zoom technique may intentionally produce a distortion of over 40% in portions of the captured image.

In some implementations, the sensor array onto which the distorted image is captured is at a resolution that is higher than the resolution at which any corresponding undistorted image reconstructed from the distorted image will be. For example, the sensor array may capture an 8 megapixel distorted image, while any corresponding undistorted image reconstructed from the information captured by the sensor array might be only a 5 megapixel image, regardless of the desired level of zoom. Although image distortion may be decoupled from an oversized sensor, and each alone can be used to gain some zoom compatibility, the two may be used in concert to produce a synergistic effect.

Because more detailed image information is captured toward the sensor array's center due to the magnification attending the radial distortion, a zoom-in feature can be implemented by passing most of the highly magnified, highly detailed image information close to the sensor array's center on to the reconstructed image while excluding, from the reconstructed image, less magnified, less detailed image information from the sensor array's periphery. In a highly zoomed-in output image (resembling an image that might be produced using a telephoto lens), the less magnified, less detailed image information at the periphery of the sensor array will be beyond the scope of the zoomed-in image's view frame anyway.

However, if a completely zoomed-out image (resembling an image that might be produced by a wide-angle lens) is desired, then relatively fewer values of the sensors in the higher-resolution sensor array may be used as values for corresponding pixels in the lower-resolution reconstructed image. Relatively few sensor values from the central parts of the sensor array will influence the reconstructed image's central pixel values, thereby reducing magnification and detail at the center of the reconstructed image to the level of magnification and detail found at the periphery of the sensor array.

Using the distorted zoom technique described above, very little pixel estimation is required in order to generate a zoomed-in image. While digital zoom techniques seek to estimate missing output pixel values based on the values of the pixels adjacent to those pixels, which often results in imprecision, the distorted zoom technique described above optically captures all or almost all of the pixel information that will be required for a zoomed-in image. Again, this lack of need for much pixel estimation is due to the increased magnification of the central portions of the lens system's subject on the sensor array, at a level of magnification and detail that is already at or nearly at the level of magnification and detail that will be needed in the most maximally zoomed-in reconstructed image. Essentially, the radial distortion and higher-resolution sensor array work together to "oversample" the information located towards the center of the lens system's subject so that optical zoom, rather than digital zoom, can be achieved.

Because the sensor array captures a distorted image, image processing is performed during image reconstruction so that the resulting reconstructed image is not distorted. One technique for reconstructing an undistorted image is known as "backward interpolation". Under the backward interpolation approach, pixel values read out of the sensor array are temporarily stored in a set of input line buffers. Since the input line buffers are used to store pixel values from the sensor array, the number of cells in each input line buffer is equal to the number of columns in the sensor array. Because the number of columns in the higher-resolution sensor array is greater than the number of pixels in each row of the reconstructed image, there are more cells within each input line buffer than there will be pixels in each row of the finally reconstructed image. Initially, the input line buffers are filled with pixel values from the uppermost rows of the sensor array. For example, if there are N input line buffers, then, initially, the input line buffers are filled with pixel values from the topmost N rows of the sensor array—one input line buffer per sensor array row. Typically, due to the expense of line buffers, the quantity of line buffers in the set of input line buffers will be less than the quantity of rows in the sensor array. Typically, effort is made to restrict the quantity of line buffers in the set of input line buffers to the minimum quantity that may be required to perform the backward interpolation technique.

Under the backward interpolation technique, pixel rows of the reconstructed image are filled in raster order, one pixel row at a time, starting at the leftmost pixel of the pixel row currently being filled (initially, the topmost pixel row in the output image) and proceeding to the rightmost pixel of that pixel row before continuing on to the next-lower pixel row in the output image. For each pixel (referred to in this discussion as an output pixel) in a row of the reconstructed image, a backward mapping is performed to map that output pixel to a corresponding pixel in the sensor array (referred to below as the input pixel). The pixel value for this input pixel, which is stored in a corresponding input line buffer cell, is used (perhaps in conjunction with the pixel values of some neighboring pixels around the input pixel) to determine the pixel value of the output pixel. The reconstructed image's pixels are filled in this manner, one-by-one, row-by-row. During this process, if it can be ascertained with certainty that a particular input line buffer's data no longer influences the pixel values of any pixels of the reconstructed image's pixel row currently being filled, then that particular input line buffer's data is replaced with pixel values from the next as-of-yet unread row of sensors in the sensor array; the set of input line buffers may be implemented in a "circular" nature.

The various output pixels in a row of the reconstructed image will most likely map back to input pixels that are on different rows of the sensor array (this is due to the distortion). For example, a first output pixel in a particular row of the reconstructed image may map back to an input pixel that is in one row of the sensor array, while another output pixel in the same particular row of the reconstructed image may map back to an input pixel that is in a different row of the sensor array. Thus, the various output pixels in a particular row of the reconstructed image will likely map back to input pixels that span across multiple rows of the sensor array. This means that in order to determine the output pixel values for all of the output pixels in that particular row of the reconstructed image, it will be necessary to refer to input pixel values on multiple rows of the sensor array. These rows of input pixel values are stored in the input line buffers; thus, there needs to be enough input line buffers to ensure that enough rows of input pixel values are stored to enable all of the output pixel values in any row of the reconstructed image to be determined. For some rows of the reconstructed image, the backward interpolation technique may need to refer to relatively few rows of input pixel values (and hence, may need relatively few input line buffers). For other rows of the reconstructed image, however, the backward interpolation technique may need to refer to many rows of input pixel values (and hence, may need many input line buffers). Enough input line buffers need to be provided to cover the worst case scenario to ensure that, for any row of the reconstructed image, all output pixel values for that row can be determined. This could be a large number of input line buffers. As the number of input line buffers increases, the amount of storage required to perform the backward interpolation technique increases proportionally, as does the expense of the digital camera that uses the backward interpolation technique. To minimize cost, and potentially for other reasons as well, it is desirable to keep the number of line buffers in an image processing system to a minimum.

One additional drawback of the backward interpolation technique derives from the random manner in which it samples from the input image. If pixels in the output image are to be filled in a consecutive manner, and if the input image is distorted, then the regions of the input image that are sampled to determine the values of the output image often will not be adjacent to each other in the input image; the sampling window will tend to "jump around." Because there is no guarantee, using the backward interpolation technique, that a (e.g., 4×4) window of input pixels sampled to produce a first output pixel will overlap at all with another window of input pixels samples to produce a second output pixel adjacent to the first output pixel in the reconstructed image, there is no opportunity for re-use of sampled input values from output pixel to output pixel. When a separate fresh window of input pixels needs to be completely resampled for each subsequent output pixel to be filled, bandwidth requirements in the device using the backward interpolation technique increase, as a larger quantity of sampled values need to be communicated for each and every output pixel. Additionally, when the input image is a mosaic image, the backward interpolation technique may require each such windows of sampled input pixels to be separately de-mosaiced prior to the computation of the value of the corresponding output pixel. This repetitive de-mosaicing, which cannot take advantage of window overlap that often does not exist, may require an inordinate amount of computational resources.

BRIEF DESCRIPTION OF THE DRAWINGS

FIG. 6 illustrates how linear approximation may be implemented based upon distance squared, in accordance with one embodiment of the present invention.

FIG. 7 shows a sample look up table, in accordance with one embodiment of the present invention.

DETAILED DESCRIPTION OF EMBODIMENT(S)

Figure 1:
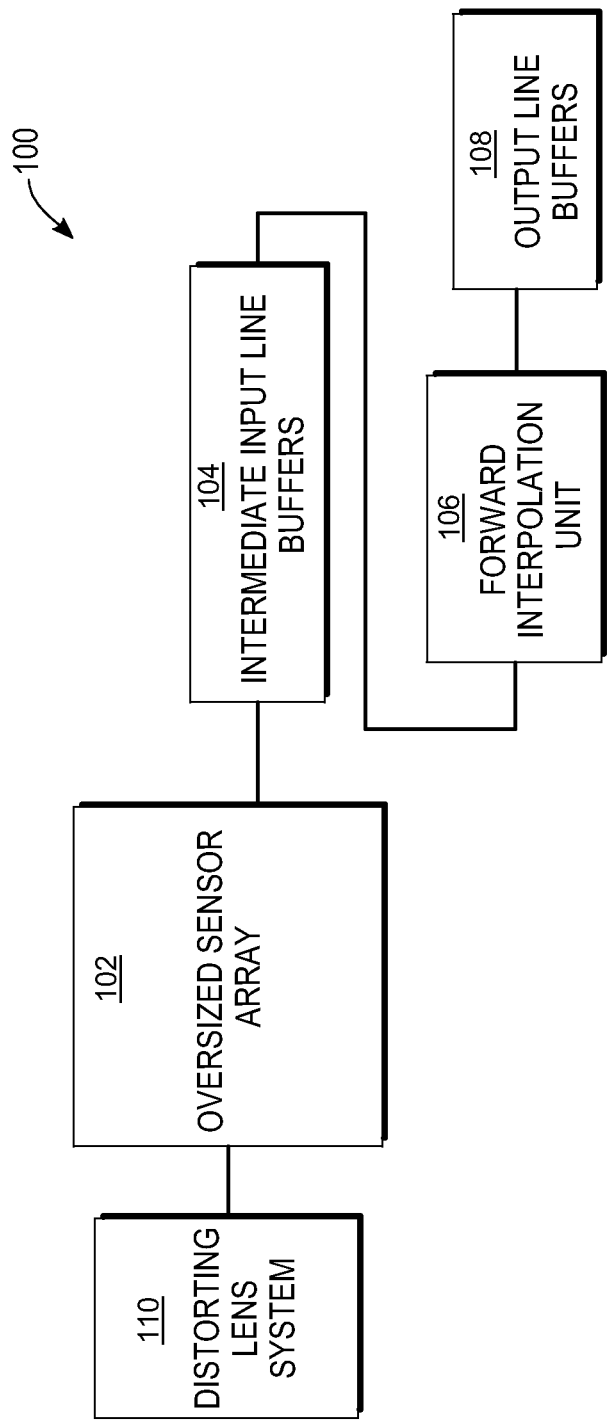
FIG. 1 shows a block diagram of an apparatus, in accordance with one embodiment of the present invention.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

In accordance with one embodiment of the present invention, a "forward interpolation" approach is provided for reconstructing an undistorted image from a distorted image captured using a distorting lens. Unlike the backward interpolation approach, which uses input line buffers to temporarily store many rows of pixel values from the sensor array, the forward interpolation approach primarily uses output line buffers to temporarily store pixel values for the reconstructed output image (only a few input line buffers are used to store a few lines of pixel values from the sensor array as they are being processed). Thus, rather than buffering the input pixel values (the pixel values from the sensor array), the forward interpolation approach primarily buffers the output pixel values (the pixel values for the reconstructed image). It has been observed by Applicants that the forward interpolation approach allows fewer line buffers to be used than the backward interpolation approach. Also, because the reconstructed image (in at least some embodiments) is smaller in size and hence has fewer pixel values per row than the sensor array, the length of each output line buffer is smaller than the length of each input line buffer. Thus, by enabling the number of line buffers and the length of each line buffer to be reduced, the forward interpolation approach makes it possible to significantly reduce the amount of storage (and hence the magnitude of cost) required to generate a reconstructed image.

According to one embodiment of the forward interpolation approach, pixel values from a sensor array are processed in raster order. For example, pixels from the sensor array are processed from left to right, one row at a time. As each pixel (referred to as an input pixel) from the sensor array is processed, a determination is made as to which, if any, pixels (referred to as output pixels) in the reconstructed image are affected by that input pixel. For each output pixel in the reconstructed image that is affected by the input pixel, a pixel value is determined for that output pixel. The value of the output pixel may be determined based upon the value of the input pixel, as well as values of neighboring pixels around the input pixel. A single input pixel may affect zero, one, or multiple output pixels, and these output pixels may be on one or more rows of the reconstructed image. Once an output pixel value is determined, it is stored in a corresponding cell of a corresponding output line buffer.

Unlike the backward interpolation technique, forward interpolation does not try to completely fill each row of the reconstructed image one row at a time. Rather, with the forward interpolation approach, sensor pixels are processed one row at a time. As the pixels in a row of sensor pixels are processed, they may cause pixel values on different rows of the reconstructed image to be determined and stored. As a result, at any particular point in time, there may be multiple partially completed rows in the reconstructed image (where a partially completed row is one in which only some of the pixels in that row have pixel values determined). As the rows of pixels from the sensor array are processed, rows of pixels in the reconstructed image will eventually be filled with pixel values. When all of the pixels of a row of the reconstructed image have pixel values determined therefor, that row of pixel values may be read out of its corresponding output line buffer, and that output line buffer may thereafter be reused to store pixel values for another row of pixels for the reconstructed image. When pixel values for all of the rows of the reconstructed image have been determined, the reconstructed image will have been completely constructed.

Beneficially, using at least one embodiment of the forward interpolation technique, as the sampling window of input pixels (e.g., a 3×3 window) slides along the input image, pixel-by-pixel in raster order, a significant quantity (e.g. 6 of 9) of the input values sampled to compute the previous output pixel can often also be used to determine the value for the current output pixel. This re-use of sampled input pixel values advantageously consumes less bandwidth in communications between the modules of an image-forming device. Furthermore, where de-mosaicing of the input image is involved during the computation of output pixels, de-mosaiced portions of the previously sampled input window do not need to be de-mosaiced again for the current input window, since a significant portion of the current input window will overlap the area that was occupied by the immediately previous input window. This re-use of demosaiced portions of the input image beneficially conserves the computational resources of an image-forming device.

Sample Image Reconstruction Apparatus

FIG. 1 shows a block diagram of an image reconstruction apparatus 100 in accordance with one embodiment of the present invention. As shown, apparatus 100 comprises a distorting lens system 110, an oversized sensor array 102, a set of intermediate input line buffers 104, a forward interpolation unit 106, and a set of output line buffers 108.

In one embodiment, the distorting lens system 110 is designed to receive light reflecting off of a scene or image, and to bend the light in such a way that a distorted version of the image is directed at the sensor array 102. The distorted version of the image may be a radially distorted image in which the central portions of the distorted image are more magnified (and therefore more detailed) than the portions of the distorted image that are along the periphery. To enable significant zoom factors (e.g. 3+) to be achieved, the distorting lens system 110 may have relatively large distortion factors (e.g. 40% or more). For purposes of the present invention, the distorting lens system 110 may be implemented using one or more lenses, and the lenses may be made of any desired material (e.g. plastic, glass, etc.).

The distorted image is directed at and captured by the sensor array 102. Sensor array 102 may be implemented using any known technology, including but not limited to charge coupled devices (CCDs) and CMOS devices. In one embodiment, the sensor array 102 is an oversized sensor array, meaning that it has a greater number of pixels (with each sensor element corresponding to a pixel) than any output image that may be reconstructed from the captured distorted image. For example, if the highest resolution output image is a 5 megapixel image (e.g. 2592×1944 pixels), the oversized sensor array 102 may be an 8 megapixel sensor array (e.g. 3264×2448 pixels). This extra resolution allows the oversized sensor array 102 to capture the additional magnification information provided by the distorting lens system 110 in certain portions of the distorted image. This additional information can be exploited to implement optical zoom.

In one embodiment, the sensor array 102 is overlaid with a color filter array (not shown), such as, for example, a Bayer filter (in the following discussion, a Bayer filter will be assumed for the sake of example; however, if so desired, other color filter arrays, or no filter arrays at all, may be used). A color filter array causes each sensor element to sense light of only one color. Thus, the pixel value from that sensor element will reflect the intensity of only that color of light. As is well known, a Bayer filter has alternating rows of R-G-R-G and G-B-G-B (where R is red, G is green, and B is blue) filter elements; thus, the sensor array 102 will have alternating rows of R-G-R-G and G-B-G-B color pixel values. Accordingly, the distorted image captured by the sensor array 102 is a mosaic image.

Several rows of pixel values from the sensor array 102 may be stored at a time in the intermediate input line buffers 104. The intermediate input line buffers 104 are used to temporarily hold pixel values from the sensor array 102 while they are being processed. To minimize storage requirements, the intermediate input line buffers 104 are few in number (e.g. 5; more or fewer intermediate input line buffers may be used if so desired). In one embodiment, each intermediate input line buffer 104 holds one row of pixel values from the sensor array 102 at a time, and each cell of an intermediate input line buffer 104 corresponds to a particular sensor element (a particular pixel) of that row. Hence, if the sensor array 102 has 3264 sensor elements per row, then each intermediate input line buffer 104 has 3264 cells. The intermediate input buffers 104 may be recaptured and reused as pixel values are processed. For example, the intermediate input line buffers 104 may initially hold the top five rows of pixel values from the sensor array 104. After the top row of pixel values is no longer needed, that intermediate input line buffer may be recaptured and reused to hold another row of pixel values from the sensor array 104. By reusing the intermediate input line buffers 104 in this way, very few are needed.

The pixel values stored in the intermediate input line buffers 104 are processed by the forward interpolation (FI) unit 106 to generate the reconstructed image. By processing the pixel values in an intermediate input line buffer 104, the FI unit 106 is in effect processing the pixel values from a corresponding row of the sensor array 102. In one embodiment, the FI unit 106 processes the pixel values (referred to as input pixel values) from the sensor array 102 in raster order, i.e., from left to right, row by row.

For each input pixel from the sensor array 102 that is processed, the FI unit 106 determines which, if any, pixels (referred to as output pixels) in the reconstructed image are affected by that input pixel. For each output pixel in the reconstructed, undistorted image that is affected by the input pixel, a pixel value is determined for that output pixel. The value of the output pixel may be determined based upon the value of the input pixel, as well as values of neighboring pixels around the input pixel. Once an output pixel value is determined, it is stored in a cell of an output line buffer 108 that corresponds to that output pixel. Because a row of input pixels is processed in raster order, and because the image captured by the sensor array 102 is distorted, the processing of a row of input pixels may cause output pixel values on different rows of the reconstructed image to be determined and stored. For example, a first input pixel in a row of input pixels may affect an output pixel that is on one row of the reconstructed image, while another input pixel in the same row of input pixels may affect an output pixel that is on a different row of the reconstructed image. Thus, at any particular point in time, there may be multiple partially completed rows (and hence, multiple partially filled output line buffers 108) in the reconstructed image. This is one reason why multiple output line buffers 108 are needed.

In one embodiment, each output line buffer 108 holds the pixel values for one row of pixels of the reconstructed image. Each cell of an output line buffer 108 corresponds to a particular pixel of that row. Hence, if the reconstructed image has 2592 pixels per row, then each output line buffer 108 has 2592 cells. At any particular time, an output line buffer 108 is associated with a particular row of the reconstructed image. In one embodiment, when that output line buffer 108 has pixel values assigned to all of its cells (thereby meaning that all of the pixel values for that particular row have been determined), the pixel values are read out of the output line buffer 108, and the output line buffer 108 is associated with another row of the reconstructed image. By reusing the output line buffers 108 in this manner, it is possible to have significantly fewer output line buffers 108 than there are rows in the reconstructed image.

Figure 2:
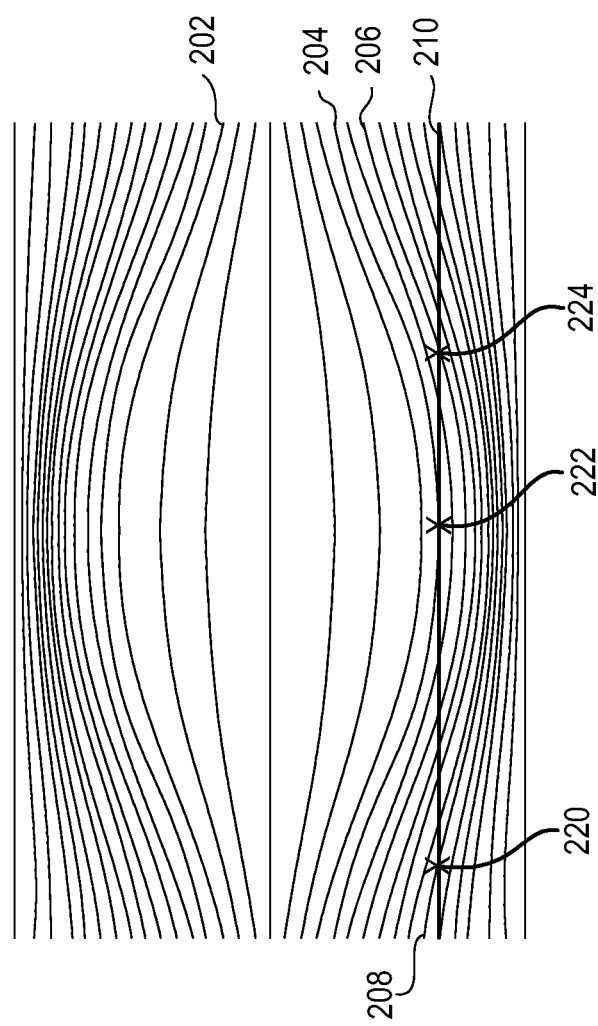
FIG. 2 shows a sample radially distorted image.
Figure 3:
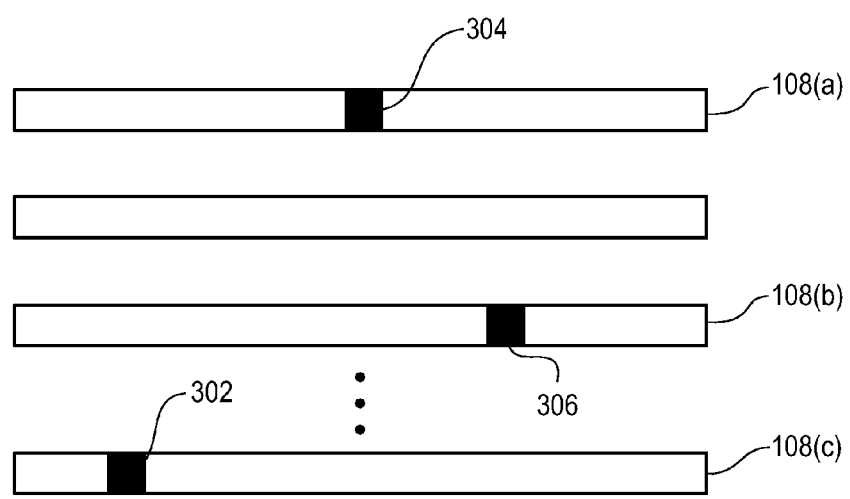
FIG. 3 shows a plurality of partially filled output line buffers, in accordance with one embodiment of the present invention.

To illustrate the interplay between the sensor array 102, the FI unit 106, and the output line buffers 108, reference will be made to the examples shown in FIGS. 2 and 3. FIG. 2 shows a sample distorted image captured by the sensor array 102, while FIG. 3 shows some sample output line buffers 108(*a*)-108(*c*). In this example, the original undistorted image has straight horizontal lines that are parallel to each other. The distorted image captured by the sensor array and shown in FIG. 2 has the lines curved and bulging in the center of the image. Assuming that all of the distortion is removed by the FI unit 106 during the image reconstruction process, the reconstructed, undistorted image will likewise have straight horizontal lines that are parallel to each other. Hence, each line (e.g. lines 202, 204, 206, 208) in the distorted image of FIG. 2 corresponds to a straight horizontal line in the reconstructed image, which in turn means that each line in the distorted image of FIG. 2 corresponds to a straight row of pixels in the reconstructed image (each line may be more than one row of pixels in the reconstructed image, depending upon how thick the line is).

As noted previously, pixels of the sensor array 102 are processed in raster order, from left to right, one row at a time. Thus, assuming that row 210 of the sensor array 102 is processed, the pixels in that row will be processed from left to right. During the processing of row 210, the FI unit 106 at some point encounters the input pixel at point 220. As can be seen from the intersection of row 210 and line 208 at point 220, this input pixel affects the pixel value of one of the pixels on line 208. Thus, the FI unit 106 determines a pixel value for that output pixel, and stores the pixel value in a cell of an output line buffer that corresponds to the row of the reconstructed image that represents the straightened version of line 208. Assuming that output line buffer 108(*c*) corresponds to the row of the reconstructed image that represents straightened line 208, the pixel value is stored in a cell 302 of output line buffer 108(*c*). As processing continues, the FI unit 106 at some point encounters the input pixel at point 222. As can be seen from the intersection of row 210 and line 204 at point 222, this input pixel affects the pixel value of one of the pixels on line 204. Thus, the FI unit 106 determines a pixel value for that output pixel, and stores the pixel value in a cell of an output line buffer that corresponds to the row of the reconstructed image that represents the straightened version of line 204. Assuming that output line buffer 108(*a*) corresponds to the row of the reconstructed image that represents straightened line 204, the pixel value is stored in a cell 304 of output line buffer 108(*a*). Continuing the example further, the FI unit 106 at some point encounters the input pixel at point 224. As can be seen from the intersection of row 210 and line 206 at point 224, this input pixel affects the pixel value of one of the pixels on line 206. Thus, the FI unit 106 determines a pixel value for that output pixel, and stores the pixel value in a cell of an output line buffer that corresponds to the row of the reconstructed image that represents the straightened version of line 206. Assuming that output line buffer 108(*b*) corresponds to the row of the reconstructed image that represents straightened line 206, the pixel value is stored in a cell 306 of output line buffer 108(*b*). As can be seen from this example, the processing of a single row of sensor pixels can cause multiple output line buffers to be partially filled with pixel values.

For cost and efficiency reasons, it is desirable to keep the number of output line buffers 108 to a minimum. In one embodiment, this minimum is set as the highest number of output line buffers that can be partially filled at any one time during forward interpolation. By having this many output line buffers 108, it is assured that there will always be a buffer available for storing an output pixel value generated by the FI unit 106. As noted previously, forward interpolation enables fewer line buffers to be used than backward interpolation. To provide an example of the storage savings that can be achieved, it has been determined by Applicants that, for an implementation in which an 8 megapixel sensor array is used to derive a 5 megapixel reconstructed image, and a 40% distortion is exhibited by the distorting lens system 110, only 150 output line buffers are needed. This is in contrast to the 166 input line buffers that would be needed under the backward interpolation approach. This reduction in line buffers, coupled with the fact that each output line buffer has significantly fewer cells (due to lower resolution) than each input line buffer, leads to a significant reduction in the amount of storage required to generate a reconstructed image. In the above example, a reduction in storage requirement of over 30% can be realized. Thus, the forward interpolation approach makes it possible to achieve substantial storage savings.

As mentioned previously, in one embodiment, the distorted image provided by the sensor array 102 is a mosaic image (where each pixel value reflects the intensity value for only one of several colors). In one embodiment, the reconstructed image is also a mosaic image. This is done to accommodate the downstream components in the image processing chain which may be expecting a mosaic image. Because the sensor array 102 and the reconstructed image are of different resolutions, and because of the distortion, there is not a direct color pattern correlation between the mosaic image of the sensor array 102 and the mosaic image of the reconstructed image (e.g. a red pixel of the sensor array 102 may not map to a red pixel in the reconstructed image). Thus, in one embodiment, when the pixel values from the sensor array 102 are processed, they are put through a demosaicing process so that for each pixel, all color pixel values are determined (e.g. if a Bayer filter is used, the red, green, and blue color pixel values for each pixel are determined). This demosaicing function may be performed by the FI unit 106 or by some other component (not shown). In one embodiment, when an intermediate input line buffer 104 stores the pixel values from a row of the sensor array 102, it stores all of the color pixel values for each pixel of that sensor array row. When it comes time to determine a pixel value for an output pixel of the reconstructed image, a determination is made as to what color that output pixel should be. The proper color pixel value is then determined for that output pixel.

Overview of Sample Embodiment of Forward Interpolation

As mentioned previously, reconstructing an undistorted image using forward interpolation rather than backward interpolation makes it possible to significantly reduce the amount of storage (e.g. line buffers) that is needed. However, because forward interpolation represents a new paradigm, it requires a new image reconstruction methodology. One possible embodiment of such a methodology will now be described. In one embodiment, this methodology is implemented, in whole or in part, by the FI unit 106.

In one embodiment, forward interpolation encompasses two main operations: (1) pixel mapping; and (2) pixel value derivation. Pixel mapping refers to the process of selecting a pixel in a distorted version of an image (e.g. a pixel in the sensor array) and determining which, if any, pixels in a reconstructed, undistorted version of the image are affected by that pixel. Because of the distortion and the fact that the distorted image may have more pixels than the reconstructed image, the pixel in the distorted image may affect zero, one, or more than one pixel in the reconstructed image. Once the pixel in the distorted image is mapped to the reconstructed image, the pixel value derivation process is implemented to derive a value for each of the pixels (if any) in the reconstructed image that is affected by the pixel in the distorted image. This forward interpolation process is performed to derive pixel values for all of the pixels in the reconstructed image. By implementing this forward interpolation methodology, the undistorted image can be reconstructed from the distorted image.

Pixel Mapping—Forward and Backward Mapping

In one embodiment, pixel mapping is achieved using a forward mapping operation and a backward mapping operation. The forward mapping operation takes a pixel in the distorted image and determines a set of candidate pixels in the reconstructed image that may be affected by that pixel in the distorted image. The backward mapping operation determines which of the candidate pixels in the undistorted image are actually affected by the pixel in the distorted image. In effect, the forward mapping operation finds the potentially affected pixels, and the backward mapping operation verifies the potentially affected pixels. It should be noted that even though both forward mapping and backward mapping are performed, the overall process is still a "forward" one. This is because the process starts with a pixel in the distorted image and determines which, if any, pixels in the reconstructed image are affected by that pixel. This is in sharp contrast to the backward interpolation process, which starts with a pixel in the reconstructed image and maps that pixel to a pixel in the distorted image. By starting with a pixel in the distorted image and determining which, if any, pixels in the reconstructed image are affected by that pixel, the amount of required storage (e.g. line buffers) is significantly reduced, as discussed above.

In one embodiment, the forward mapping operation maps a pixel (referred to as the input pixel) in the distorted image to a pixel (referred to as the output pixel) in the reconstructed image. The forward mapping operation does so by implementing a distortion removal function to determine where the input pixel would be located in the reconstructed image if the distortion were substantially removed from the distorted image. For purposes of the present invention, this distortion removal function may be achieved using any desired means. For example, a look up table (LUT) with values pre-calculated to counter the distorting effect of the distorting lens may be used. Alternatively, a calculation mechanism which is configured to implement a function that counters the distorting effect of the distorting lens system may be used to calculate the mapping values on the fly. These and other mechanisms may be used within the scope of the present invention. In one embodiment, in performing the forward mapping, the FI unit 106 also takes into account any zoom factor that is implemented in the reconstructed image, any scaling factors due to the difference in size between the distorted image captured by the sensor array 102 and the reconstructed image (recall that in many embodiments the sensor array has more pixels than the reconstructed image), as well as any other factors that may affect where the input pixel is mapped to the reconstructed image (actual mapping will be discussed in greater detail in a later section).

In one embodiment, the input pixel is forward mapped to the output pixel by translating the coordinates of the input pixel in the sensor array domain to a set of coordinates in the reconstructed image domain. For nomenclature purposes, the coordinates in the sensor array domain will be referred to as (x, y) coordinates and the coordinates in the reconstructed image domain will be referred to as (u, v) coordinates. For example, if the input pixel is in the 100th column and the 50th row of the sensor array, its (x, y) coordinates would be (100, 50), and if the output pixel is in the 95th column and the 90th row of the reconstructed image, its (u, v) coordinates would be (95, 90). If the sensor array is an 8 megapixel array, the input pixel coordinates would range from (1, 1) to (3264, 2448), and if the reconstructed image is a 5 megapixel image, the output pixel coordinates would range from (1, 1) to (2592, 1944). In translating the (x, y) coordinates of the input pixel to the (u, v) coordinates of the output pixel, the FI unit 106 will most likely generate decimal values (i.e. non integer values) for the u and v coordinates of the output pixel. These decimal values may be rounded, truncated, or processed in some other way to derive integer values for the u and v coordinates. The resulting integer u and v coordinate values will determine which pixel in the reconstructed image is the output pixel to which the input pixel has been mapped.

After the input pixel is forward mapped to the output pixel, a set of pixels within proximity of the output pixel in the reconstructed image is selected. These pixels, referred to as candidate pixels, represent the pixels in the reconstructed image that may be affected by the input pixel. These candidate pixels may, for example, be pixels within an n×n neighborhood (e.g. 3×3, 4×4, etc.) of the output pixel. The neighborhood is made sufficiently large to ensure that all pixels in the reconstructed image that may be affected by the input pixel are included in the candidate pixels. In one embodiment, the candidate pixels include and surround the output pixel. For example, if the (u, v) coordinates of the output pixel are $(u_i, v_i)$, the coordinates of the candidate pixels (assuming a 3×3 neighborhood) may be $(u_i-1, v_i-1)$, $(u_i, v_i-1)$, $(u_i+1, v_i-1)$, $(u_i-1, v_i)$, $(u_i, v_i)$, $(u_i+1, v_i)$, $(u_i-1, v_i+1)$, $(u_i, v_i+1)$, and $(u_i+1, v_i+1)$.

After the candidate pixels are determined, a backward mapping operation is performed on each of the candidate pixels to determine whether that candidate pixel actually maps back to the input pixel. In one embodiment, the backward mapping operation implements a distorting function to determine where a candidate pixel would be located in the distorted image if distortion from the distorting lens were added to the reconstructed image. In one embodiment, this distorting function is an inverse function of the distortion removal function implemented in the forward mapping operation. As with the distortion removal function, this distorting function may be implemented using any desired means including, but not limited to, a LUT with values precalculated to implement the distorting effect of the distorting lens and a calculation mechanism configured to implement a function that simulates the distorting effect of the distorting lens to calculate the mapping values on the fly. In one embodiment, in performing the backward mapping, the FI unit 106 takes into account any zoom factor that is implemented in the reconstructed image, any scaling factors due to the difference in size between the distorted image captured in the sensor array 102 and the reconstructed image, as well as any other factors that may affect where the candidate pixel is mapped to the distorted image.

In one embodiment, in backward mapping a candidate pixel to the distorted image captured by the sensor array 102, the FI unit 106 translates the (u, v) coordinates of the candidate pixel into a set of (x, y) coordinates of a pixel in the sensor array 102 to which the candidate pixel is mapped. In translating the (u, v) coordinates of the candidate pixel to the (x, y) coordinates of the sensor pixel, the FI unit 106 will most likely generate decimal values for the x and y coordinate values. For example, the decimal value for the x coordinate may be $x_j+dx$, where dx is the decimal portion of the x coordinate value, and the decimal value for the y coordinate may be $y_j+dy$, where dy is the decimal portion of the y coordinate value. These decimal values may be rounded, truncated, or processed in some other way to derive integer values for the x and y coordinates. The resulting integer x and y coordinate values will determine to which sensor pixel the candidate pixel has been mapped. To determine whether this sensor pixel is the same pixel as the input pixel (that is, to determine whether the candidate pixel maps back to the input pixel), the FI unit 106 compares the resulting integer x and y coordinate values with the (x, y) coordinates of the input pixel.

If a candidate pixel maps back to the input pixel, then it is deemed to be an affected pixel. After the backward mapping operation is performed on all of the candidate pixels, a set of zero or more affected pixels will be determined. These affected pixels are the pixels in the reconstructed image that are verified to be affected by the input pixel. Because of the distortion and the fact that the distorted image may have more pixels than the reconstructed image, it is possible for none, some, or all of the candidate pixels to be mapped back to the input pixel. In the manner described, it is determined which, if any, pixels in the reconstructed image are affected by the input pixel.

In the above discussion, the forward and backward mapping approach is described in the context of mapping an input pixel from a distorted version of an image to zero or more pixels of an undistorted version of the image. While this is one possible use of the forward-backward mapping approach, it is certainly not the only one. As far as the present invention is concerned, the forward-backward mapping approach may be used in any application in which it is desirable to map an input pixel of a first version of an image to zero or more pixels of a second version of the image. Just as an example, the first version may be an undistorted version of the image and the second version may be a distorted version of the image (this may be desirable, for example, to distort an image for simulation purposes, special effects purposes, etc.). Generally, the forward-backward mapping approach may be used to map an input pixel of any version of an image to zero or more pixels of any other version of the image. To change from one application to another, all that has to be changed are the specific mapping functions that are implemented by the forward mapping operation and the backward mapping operation (the forward and backward mapping functions may be and often are inverse functions). The overall approach remains the same. Thus, the forward-backward mapping approach is a general approach that is not limited to the context discussed above in which a pixel in a distorted image is mapped to zero or more pixels in an undistorted image.

Pixel Value Derivation

Once the set of affected pixels is determined, a pixel value is derived for each of the affected pixels. In one embodiment, the pixel value for an affected pixel may be derived based solely upon the pixel value of the input pixel, or based upon the pixel values of the input pixel and one or more other pixels within proximity of the input pixel using some type of interpolation (this is why multiple intermediate input line buffers 104 are implemented; they store pixel values for pixels around the input pixel, which enable interpolation to be performed). For purposes of the present invention, any type of interpolation may be used including, but not limited to, nearest neighbor, bilinear, bicubic, cubic B-spline, etc., all of which are well known (e.g. see "Digital Image Warping", George Wolberg, ISBN: 978-0-8186-8944-4, July 1990, Wiley-IEEE Computer Society Press; and "Cubic convolution interpolation for digital image processing", R. Keys, (1981), IEEE Transactions on Signal Processing, Acoustics, Speech, and Signal Processing 29; both of these references are hereby incorporated by reference). In performing the interpolation, the dx and dy values mentioned previously may be used. For example, if an affected pixel maps back to the input pixel with an x coordinate of $x_j+dx$ and a y coordinate of $y_j+dy$, then the dx and dy decimal portions may be used to generate the weighting factors/coefficients that are used in the interpolation process to derive a pixel value for the affected pixel.

In one embodiment, the cubic B-spline interpolation approach is used to derive the pixel value for an affected pixel using a 4×4 support area (i.e. a 4×4 neighborhood of pixels around the input pixel). In such an embodiment, the coefficients for the x and y coordinates may be derived as follows:

Coefficients for x:

$Coeff_1 = \alpha(dx^3 + 2dx^2 + dx);$ $Coeff_2 = \alpha(dx^3 - dx^2);$ and $Coeff_3 = 2dx^3 - 3dx^2;$ Coefficients for y:

$$\text{Coeff}_1 = \alpha(dy^3 + 2dy^2 + dy);$$

$$\text{Coeff}_2 = \alpha(dy^3 - dy^2); \text{ and}$$

$$\text{Coeff}_3 = 2dy^3 - 3dy^2;$$

where α is a configurable parameter which, in one embodiment, is set to −0.65. Using these coefficients, the pixel values in the 4×4 support area, and the cubic B-spline formulation, a pixel value can be derived for each of the affected pixels.

Once a pixel value is derived for an affected pixel, it is stored for future access (for example, in a corresponding cell of a corresponding output line buffer). In one embodiment, the pixel value for each pixel in the reconstructed image is derived only once; that is, once a pixel value is derived for a pixel in the reconstructed image, it does not need to be updated. This significantly reduces the amount of hardware and processing resources that are needed to implement the image reconstruction methodology.

Flow Diagram

Figure 4:
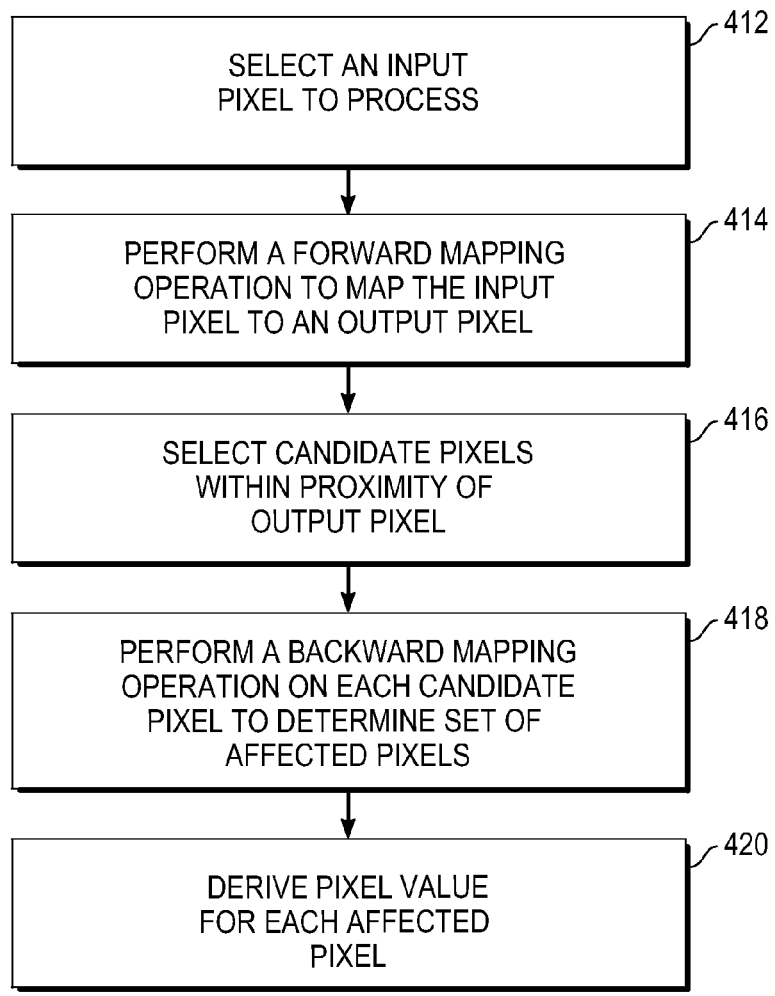
FIG. 4 shows a flow diagram of a forward interpolation approach using forward and backward mapping, in accordance with one embodiment of the present invention.

With reference to FIG. 4, there is shown a flow diagram for the forward interpolation methodology discussed above. This flow diagram illustrates how a first version of an image (e.g. a distorted version) may be used to construct a second version of the image (e.g. an undistorted version). As shown, the methodology begins with selecting (block 412) an input pixel to process. This input pixel is one of the pixels of the first version of the image. The input pixel may, for example, be one of the pixels from the sensor array 102. In one embodiment, the input pixel is selected from a set of pixels that is referred to herein as pixels of interest. To elaborate upon the concept of a pixel of interest, it is noted that not all pixels of the first version of the image are necessarily processed to construct the second version of the image. For example, if the second version of the image is a zoomed version of the first version of the image, then some of the peripheral pixels in the first version of the image will be cropped and hence not make their way into the second version of the image. Thus, there is no point in processing those pixels. To improve processing efficiency, one embodiment of the methodology selects for processing only those pixels (referred to as pixels of interest) in the first version of the image that may potentially contribute to the construction of the second version of the image. Thus, in one embodiment, before the input pixel selection operation is performed, a determination is made as to which pixels in the first version of the image are pixels of interest. This determination may be made based upon various factors, such as how much distortion there is between the first and the second versions of the image, the zoom factor, if any, that is implemented between the two versions, any size (e.g. resolution) differences between the first and second versions, etc. Once the pixels of interest are determined, the input pixel may be selected from those pixels.

After the input pixel is selected, a forward mapping operation is performed (block 414) on the input pixel to map it to one of the pixels in the second version of the image, referred to as the output pixel. In one embodiment, this forward mapping operation implements a forward mapping function. For purposes of the present invention, this forward mapping function may be any type of mapping function, including but not limited to any type of geometrical manipulation function (e.g. a distortion removal function). This forward mapping function may take into account any zoom factor that is implemented in the second version of the image, any scaling factors due to a difference in size between the first version of the image and the second version of the image, as well as any other factors that may affect where the input pixel is mapped in the second version of the image.

After the input pixel is mapped to the output pixel, a set of pixels in the second version of the image within proximity of the output pixel are selected (block 416) as candidate pixels. These candidate pixels are the pixels in the second version of the image that may be affected by the input pixel. In one embodiment, the candidate pixels are the pixels within an n×n (e.g. 3×3, 4×4, etc.) neighborhood of the output pixel.

After the candidate pixels are determined, a backward mapping operation is performed (block 418) on each of the candidate pixels to determine whether that candidate pixel maps back to the input pixel. In one embodiment, this backward mapping operation implements a backward mapping function which is the inverse of the forward mapping function. For purposes of the present invention, this backward mapping function may be any type of mapping function, including but not limited to any type of geometrical manipulation function (e.g. a distorting function). This backward mapping function may take into account any zoom factor that is implemented in the second version of the image, any scaling factors due to a difference in size between the first version of the image and the second version of the image, as well as any other factors that may affect to which pixel in the first version of the image a candidate pixel is mapped.

Each candidate pixel that actually maps back to the input pixel is deemed to be an affected pixel. After the backward mapping operation is performed on all of the candidate pixels, a set of zero or more affected pixels is determined. These affected pixels represent all of the pixels in the second version of the image that have been verified to be affected by the input pixel.

After the affected pixels are determined, a pixel value is derived (block 420) for each of the affected pixels. The pixel value for an affected pixel may be derived based solely upon the pixel value of the input pixel, or based upon the pixel values of the input pixel and one or more other pixels within proximity of the input pixel using some type of interpolation. Once a pixel value is derived for an affected pixel, it is stored for future access (for example, in a corresponding cell of a corresponding output line buffer). After pixel values have been derived for all of the affected pixels, processing of the input pixel is completed and the method loops back to block 412 to select another input pixel for processing.

In one embodiment, the next input pixel is selected in such a way that it is in raster order from the previously selected input pixel. That is, the input pixels are selected from the pixels of interest in such a way that the selection is from left to right and from an upper row to a lower row. Once the next input pixel is selected, the process shown in FIG. 4 is repeated to find another set of affected pixels and to derive pixel values for those affected pixels. As each output line buffer becomes completely filled with pixel values, the pixel values stored in the filled output line buffer are read out and passed on to one or more components further down in the image processing chain. The output line buffer is thereafter reused to store pixel values for another row of the second version of the image. The process shown in FIG. 4 repeats until pixel values have been derived for all of the pixels in the second version of the image. At that point, the image reconstruction process is complete and the process can be halted. In this manner, the forward interpolation methodology can be used to construct a second version of an image using a first version of the image.

Sample Mapping Details

As mentioned previously, an input pixel from the sensor array 102 is forward mapped to an output pixel of a reconstructed image by translating the (x, y) coordinates of the input pixel in the sensor array domain into (u, v) coordinates of the output pixel in the reconstructed image domain. Similarly, a candidate pixel in the reconstructed image is backward mapped to a sensor pixel in the sensor array 102 by translating the (u, v) coordinates of the candidate pixel in the reconstructed image domain into (x, y) coordinates of the sensor pixel in the sensor array domain. To illustrate how this mapping may be carried out in accordance with one embodiment of the present invention, some additional details will now be provided. In one embodiment, mapping is performed, in whole or in part, by the FI unit 106.

In the following discussion, reference will be made to the following parameters: $x_{max}$, $y_{max}$, $u_{max}$, and $v_{max}$. These parameters refer to the maximum values for the x, y, u, and v coordinates, which will depend on the size of the sensor array 102 and the reconstructed image. For example, if the sensor array 102 is an 8 megapixel array having 3264 columns and 2448 rows, then $x_{max}$ would be 3264 and $y_{max}$ would be 2448. Similarly, if the reconstructed image is a 5 megapixel image having 2592 columns and 1944 rows, then $u_{max}$ would be 2592 and $v_{max}$ would be 1944.

In the following discussion, it will be assumed that the amount of distortion imposed by the distorting lens system 110 varies proportionally with the distance from the focal center of the lens. For the sake of example, it will be assumed that the focal center of the distorting lens system 110 coincides with the center pixel (with coordinates ($x_{max}/2$, $y_{max}/2$)) of the sensor array 102. Thus, the amount of distortion imposed by the distorting lens system 110 on a pixel is assumed to vary proportionally with the distance of the pixel from the center pixel of the sensor array 102.

Forward Mapping Details

Figure 5:
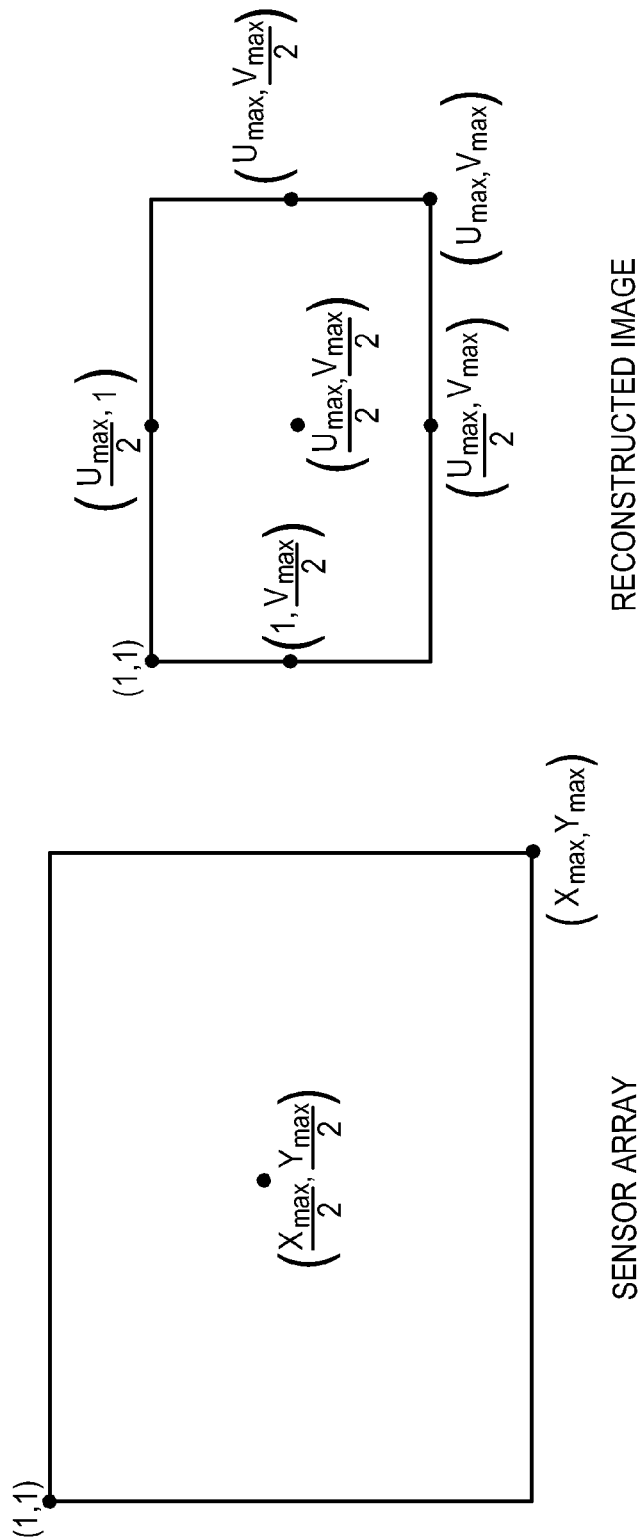
FIG. 5 shows the coordinate systems of a sensor array and a reconstructed image, in accordance with one embodiment of the present invention.

In the following discussion, it will be assumed that the input pixel of the sensor array that is being forward mapped to the reconstructed image has general coordinates of X and Y. As shown in FIG. 5, these coordinates can range from (1, 1) to ($x_{max}$, $y_{max}$). Initially, the X and Y coordinates are processed to derive "centered" coordinates as follows:

$$X_c = X - x_{max}/2; \text{ and}$$

$$Y_c = Y - y_{max}/2.$$

$X_c$ and $Y_c$ represent the coordinates of the input pixel relative to the center pixel ($x_{max}/2$, $y_{max}/2$) of the sensor array.

The distance (r) of the input pixel from the center of the sensor array is calculated as:

$$r = \text{square root of } X_c^2 + Y_c^2.$$

As noted above, the amount of distortion imposed by the distorting lens system on a pixel varies proportionally with the distance of the pixel from the center pixel of the sensor array. Thus, based upon this distance r, a distortion removal factor D' (which would remove the distortion imposed by the distorting lens system) can be determined. For purposes of the present invention, D' may be determined using any desired mechanism. For example, D' may be determined using a look up table (LUT) with pre-calculated distortion removal values. Alternatively, a calculation mechanism which is configured to implement a function that calculates distortion removal values on the fly may be used to calculate D'. These and other mechanisms may be used within the scope of the present invention. Since the distortion actually imposed by a lens distorting system will vary from lens system to lens system, the LUT and/or the calculation mechanisms are customized for the particular lens distorting system that is actually used to capture the distorted image. In one embodiment, in addition to accounting for distortion removal, the distortion removal factor D' also takes into account any scaling factors that need to be implemented to account for the difference in size between the sensor array and the reconstructed image. For the LUT implementation, this may mean having a separate LUT for each possible reconstructed image size. For example, if the reconstructed image can be a 3 megapixel image, a 4 megapixel image, or a 5 megapixel image, a separate LUT may be provided for the 3 megapixel image, the 4 megapixel image, and the 5 megapixel image.

After the distortion removal factor D' is determined for the input pixel, it is applied to the centered coordinates ($X_c$ and $Y_c$) of the input pixel to translate the centered coordinates into a set of centered (u, v) coordinates in the reconstructed image domain. In effect, this translation determines where the input pixel would be in the reconstructed image if the distortion imposed by the distorting lens system 110 were removed. As part of this translation, any zoom factor implemented in the reconstructed image is also taken into account. This operation is shown in the following equations:

$$U_c = X_c \cdot D' \cdot Z; \text{ and}$$

$$V_c = Y_c \cdot D' \cdot Z;$$

where Z is the zoom factor implemented in the reconstructed image, and $U_c$ and $V_c$ are the centered (u, v) coordinates for the output pixel of the reconstructed image to which the input pixel is mapped ($U_c$ and $V_c$ represent the coordinates of the output pixel relative to the center pixel ($u_{max}/2$, $v_{max}/2$) of the reconstructed image (as shown in FIG. 5)). To derive the actual coordinates of the output pixel, the centered coordinates $U_c$ and $V_c$ are "decentered" as follows:

$$U = U_c + u_{max}/2; \text{ and}$$

$$V = V_c + v_{max}/2.$$

The actual coordinates U and V of the output pixel are thus derived. As mentioned previously, these coordinates are most likely decimal values; thus, they are rounded, truncated, or processed in some other manner to derive integer values. Once derived, these integer values represent the U and V coordinates of the output pixel in the reconstructed image to which the input pixel is mapped. Forward mapping is thus achieved.

Backward Mapping Details

A substantially inverse process may be used to backward map a candidate pixel in the reconstructed image to a sensor pixel in the sensor array 102. In the following discussion, it will be assumed that the candidate pixel of the reconstructed image that is being mapped to the sensor array 102 has general coordinates of U and V. As shown in FIG. 5, these coordinates can range from (1, 1) to ($u_{max}$, $v_{max}$). Initially, the U and V coordinates are processed to derive "centered" coordinates as follows:

$$U_c = U - u_{max}/2; \text{ and}$$

$$V_c = V - v_{max}/2,$$

where $U_c$ and $V_c$ represent the coordinates of the candidate pixel relative to the center pixel ($u_{max}/2$, $v_{max}/2$) of the reconstructed image.

Thereafter, the zoom factor implemented in the reconstructed image is removed from the centered coordinates as follows:

$$U_z = U_c/Z; \text{ and}$$

$$V_z = V_c/Z,$$

where $U_z$ and $V_z$ are the unzoomed, centered coordinates of the candidate pixel, and Z is the zoom factor implemented in the reconstructed image.

The unzoomed distance (r) of the candidate pixel from the center ($u_{max}$, $v_{max}$) of the reconstructed image is calculated as:

$$r = \text{square root of } U_z^2 + V_z^2.$$

Based upon this distance r, a distortion factor D (which would impose the distortion of the distorting lens system 110) can be determined. For purposes of the present invention, D may be determined using any desired mechanism. For example, D may be determined using a look up table (LUT) with pre-calculated distortion removal values. Alternatively, a calculation mechanism which is configured to implement a function that calculates distortion values on the fly may be used to calculate D. These and other mechanisms may be used within the scope of the present invention. Since the distortion actually imposed by a lens distorting system will vary from lens system to lens system, the LUT and/or the calculation mechanisms are customized for the particular lens distorting system that is actually used to capture the distorted image. In one embodiment, in addition to accounting for distortion, the distortion factor D also takes into account any scaling factors that need to be implemented to account for the difference in size between the reconstructed image and the sensor array. For the LUT implementation, this may mean having a separate LUT for each possible reconstructed image size. For example, if the reconstructed image can be a 3 megapixel image, a 4 megapixel image, or a 5 megapixel image, a separate LUT may be provided for the 3 megapixel image, the 4 megapixel image, and the 5 megapixel image.

After the distortion factor D is determined for the candidate pixel, it is applied to the unzoomed, centered coordinates ($U_z$ and $V_z$) of the candidate pixel to translate the unzoomed, centered coordinates into a set of centered (x, y) coordinates in the sensor array. This operation is shown in the following equations:

$$X_c = U_z \cdot D; \text{ and}$$

$$Y_c = V_z \cdot D;$$

where $X_c$ and $Y_c$ are the centered (x, y) coordinates for the sensor pixel of the sensor array to which the candidate pixel is mapped ($X_c$ and $Y_c$ represent the coordinates of the sensor pixel relative to the center pixel ($x_{max}/2$, $y_{max}/2$) of the sensor array). To derive the actual coordinates of the sensor pixel, the centered coordinates $X_c$ and $Y_c$ are "decentered" as follows:

$$X = X_c + x_{max}/2; \text{ and}$$

$$Y = Y_c + y_{max}/2.$$

The actual coordinates X and Y of the sensor pixel are thus derived. As mentioned previously, these coordinates are most likely decimal values; thus, they are rounded, truncated, or processed in some other manner to derive integer values. Once derived, these integer values represent the X and Y coordinates of the sensor pixel in the sensor array to which the candidate pixel is mapped. Backward mapping is thus achieved.

Pixels of Interest

It was mentioned previously that not all pixels of the sensor array 102 necessarily need to be processed to generate the reconstructed image. Rather, for efficiency and other reasons, only sensor pixels (referred to as pixels of interest) that may affect the pixels of the reconstructed image are processed. The following discussion provides one possible technique for determining which sensor pixels are pixels of interest.

In one embodiment, the coordinates of the pixels of interest may be determined by backward mapping four pixels of the reconstructed image to corresponding sensor pixels in the sensor array. These four pixels are shown in FIG. 5 as the pixels with the following (u, v) coordinates: ($u_{max}/2$, 1), ($u_{max}/2$, $v_{max}$), (1, $v_{max}/2$), and ($u_{max}$, $v_{max}/2$).

When pixel ($u_{max}/2$, 1) is backward mapped (in the manner described above) to a sensor pixel in the sensor array 102, a set of x and y coordinate values are generated for that sensor pixel. The y coordinate value for that sensor pixel will be designated $Y_{start}$.

When pixel ($u_{max}/2$, $v_{max}$) is backward mapped to a sensor pixel in the sensor array 102, a set of x and y coordinate values are generated for that sensor pixel. The y coordinate value for that sensor pixel will be designated $Y_{end}$.

When pixel (1, $v_{max}/2$) is backward mapped to a sensor pixel in the sensor array 102, a set of x and y coordinate values are generated for that sensor pixel. The x coordinate value for that sensor pixel will be designated $X_{start}$.

When pixel ($u_{max}$, $v_{max}/2$) is backward mapped to a sensor pixel in the sensor array 102, a set of x and y coordinate values are generated for that sensor pixel. The x coordinate value for that sensor pixel will be designated $X_{end}$.

In one embodiment, the pixels of interest are those pixels having x coordinates between $X_{start}$ and $X_{end}$, and y coordinates between $Y_{start}$ and $Y_{end}$.

Linear Approximation Based on Distance Squared

In the mapping details discussed above, both the distortion removal factor D' and the distortion factor D are determined based upon a distance r. For D', the distance r is derived from the square root of $X_c^2 + Y_c^2$. For D, the distance r is derived from the square root of $U_z^2 + V_z^2$. In either case, the FI unit 106 has to perform a square root function in order to derive the distance r. From a hardware implementation standpoint, performing a square root function is difficult and expensive.

In some situations, it may be desirable to implement the FI unit 106 in hardware. To facilitate such hardware implementations, a methodology will now be described which allows D' and D to be determined based not upon the distance r but rather upon the square ($r^2$) of the distance r. With this methodology, it is possible to eliminate the need for the FI unit 106 to perform a square root function, which in turn makes implementing the FI unit 106 in hardware much simpler and less expensive. In the following discussion, for the sake of simplicity, the term "adjustment factor" (AF) will be used generally to encompass both D' and D. In the context of mapping a pixel in a distorted version of an image to a pixel in an undistorted version of the image, the AF will be a distortion removal factor D'. In the context of mapping a pixel in an undistorted version of an image to a pixel in a distorted version of the image, the AF will be a distortion factor D. The methodology described below may be applied to either context to determine a distortion removal factor D' or a distortion factor D.

To illustrate how an AF may be determined based upon the square of a distance, reference will be made to the example shown in FIG. 6. Suppose that a pixel at a square distance of $r_1^2$ is known to experience an adjustment factor of $AF_1$. Suppose further that a pixel at a square distance of $r_2^2$ is known to experience an adjustment factor of $AF_2$. If, as shown in FIG. 6, a pixel has a square distance $r^2$ that is between $r_1^2$ and $r_2^2$, then the AF experienced by that pixel can be calculated using a linear approximation as follows:

$$AF = AF_1 + \alpha \cdot (AF_2 - AF_1), \text{ where}$$

$$\alpha = (r^2 - r_1^2)/(r_2^2 - r_1^2).$$

It has been observed by Applicants that if the difference between $r_2^2$ and $r_1^2$ is kept sufficiently small, the linear approximation approach enables sufficiently accurate results to be achieved. With this linear approximation approach in mind, a look up table (LUT) can be constructed to enable an adjustment factor AF for a pixel to be easily derived.

A sample LUT 700 is shown in FIG. 7. As shown, LUT 700 has a plurality of entries (where each column may be viewed as an entry), with each entry having a value for $r^2$, a value for the adjustment factor AF, and a value for an adjustment differential (AD). In LUT 700, the AF in an entry indicates what adjustment factor is experienced by a pixel when that pixel is at the square distance indicated by the $r^2$ value in the entry. For example, the AF value in the 0th entry indicates that when a pixel is at a square distance $(r_0^2)$ of 0, that pixel experiences an adjustment factor of $AF_0$. Similarly, the AF value in the first entry indicates that when a pixel is at a square distance $(r_1^2)$ of $\Delta$, it experiences an adjustment factor of $AF_1$.

In LUT 700, the $r^2$ values of the various entries are separated by a fixed increment of $\Delta$. In one embodiment, $\Delta$ is $2^n$ where n is any integer greater than 0. Setting the fixed increment $\Delta$ to be a power of 2 makes it possible to divide by the $\Delta$ by performing simple shifting operations rather than performing actual division operations. This helps to further simplify the hardware implementation of the FI unit 106. To ensure that the results of the linear approximation approach are sufficiently accurate, the fixed increment A in one embodiment is kept relatively small. Thus, the power n is set to 1, 2, 3, or some other integer that keeps $\Delta$ small enough such that the results of the linear approximation remain sufficiently accurate.

In LUT 700, the adjustment differential AD in each entry indicates the difference in AF between that entry and the next entry in the LUT 700. For example, the AD value in the 0th entry indicates the difference between the AF value $(AF_1)$ in the next entry (the first entry) and the AF value $(AF_0)$ in the 0th entry. Similarly, the AD value in the first entry indicates the difference between the AF value $(AF_2)$ in the next entry (the second entry) and the AF value $(AF_1)$ in the first entry. This AD value in effect allows the difference between the AF value in the next entry and the AF value in the current entry to be determined without having to access and read the next entry. As will be made clear in a later section, this makes it possible to derive an AF for a pixel by accessing only one entry of LUT 700. This helps to further simplify the hardware implementation of the FI unit 106 and improve the processing efficiency thereof. For purposes of the present invention, each AD value may be stored as the actual difference between the AF value of the next entry and the AF value of the current entry (which would be a signed value), or it may be stored as the absolute value of this difference. If the AD value is stored as an absolute value, a sign will be assigned to the absolute value at the time an AD is processed. Since all of the ADs are monotonic (and hence, have the same sign), adding the proper sign at processing time is easy to do.

To illustrate how the FI unit 106 can derive an AF for a pixel using LUT 700 and $r^2$ linear approximation, reference will now be made to an example. In the following example, it will be assumed that the fixed increment A is set to $2^3$ or 8. Thus, the $r^2$ values for the $0^{th}$ through $5^{th}$ entries of the LUT 700 are assumed to be 0, 8, 16, 24, 32, and 40, respectively.

To derive an AF for a pixel, the FI unit 106 initially determines an $r^2$ value for the pixel. Using the values provided above in the forward mapping and backward mapping discussions, $r^2$ may be determined as follows:

$$r^2 = X_c^2 + Y_c^2; \text{ or}$$

$$r^2 = U_z^2 + V_z^2;$$

depending upon whether forward or backward mapping is being performed.

After $r^2$ is determined for the pixel, the FI unit 106 determines where the $r^2$ value for the pixel falls relative to the $r^2$ values in the various entries of the LUT 700. Put another way, the FI unit 106 determines which two $r^2$ values in the LUT 700 the $r^2$ value for the pixel falls between. In one embodiment, the FI unit 106 does so by dividing the $r^2$ value of the pixel by $\Delta$. Because $\Delta$ is a power of 2, this division can be carried out with simple shifting operations rather than actual division operations. The result of this operation will likely be a non integer value; thus, to derive an integer result, the non integer result is truncated. The integer result may thereafter be used as an index to access the appropriate entry in the LUT 700. For example, suppose that the $r^2$ value for a pixel is 25. Dividing by $\Delta$ (which is 8 in the current example) and truncating provides an integer result of 3. Using this integer value as an index, the FI unit 106 determines that it is the third entry of the LUT 700 that should be accessed. Notice that this third entry is the entry where the $r_3^2$ value (24) is closest to but smaller than the $r^2$ value (25) of the pixel. With this operation, the FI unit 106 is able to determine that the $r^2$ value for the pixel is between the $r^2$ values of the third and the fourth entries in the LUT 700 (i.e. is between $r_3^2$ and $r_4^2$).

After determining the index of the entry that should be accessed, the FI unit 106 accesses that entry (the third entry in the current example) of the LUT 700 and obtains therefrom the $r^2$ value, the AF value, and the AD value. In the current example, these values are 24 (for $r_3^2$), $AF_3$, and $AF_4 - AF_3$, respectively. With these values, and knowledge that the fixed increment $\Delta$ is 8, the FI unit 106 has the information that it needs to calculate an AF (using linear approximation) for the pixel.

Specifically, the AF for the pixel can be calculated using the following equations:

$$AF = AF_3 + \alpha \cdot (AF_4 - AF_3), \text{ where}$$

$$\alpha = (r^2 - r_3^2)/(r_4^2 - r_3^2).$$

From the third entry of the LUT 700, the FI unit 106 has obtained $r_3^2$, $AF_3$, and $AF_4 - AF_3$. From previous computation, the FI unit 106 knows the $r^2$ value of the pixel. Furthermore, since the increment in $r^2$ values between consecutive entries of the LUT 700 is fixed at A, the FI unit 106 knows that $(r_4^2 - r_3^2)$ is equal to $\Delta$ (8 in the current example). Thus, the FI unit 106 has all of the data that it needs. Accordingly, the FI unit 106 calculates a linear approximation value for the AF for the pixel. Notice that this AF is derived by accessing just one entry in the LUT 700. Furthermore, notice that no square root operation is required, and that all division operations with $\Delta$ in the denominator are carried out by shifting operations rather than actual division operations. Thus, with this methodology, if the FI unit 106 is implemented in hardware, that hardware implementation can be kept relatively simple and inexpensive.

After the AF is derived, the FI unit 106 uses the AF to map the pixel in a first version of an image to a pixel in a second version of the image. This mapping may, for example, be a forward mapping that maps a pixel in a distorted version of an image to a pixel in an undistorted version of the image, or it may be a backward mapping that maps a pixel in an undistorted version of an image to a distorted version of the image. The forward and backward mappings may be carried out in the manner previously described.

Sample Implementations

The technique(s) described above may be implemented in whole or in part by the FI unit 106. For purposes of the present invention, the FI unit 106 may be implemented using any known technology. For example, the FI unit 106 may be hardware implemented using a device (e.g. a programmable logic array) having an array of elements, including logic elements, wherein the elements are programmed/configured to implement the technique(s) described herein. As an alternative, the FI unit 106 may be hardware implemented by way of another device such as an application specific integrated circuit (ASIC) having elements, including logic elements, that are constructed/configured to implement the technique(s) described herein. Overall, the FI unit 106 maybe be hardware implemented using any number of devices with elements, including logic elements, that are constructed/configured to implement the technique(s) described herein. As a further alternative, the FI unit 106 may be software implemented such that the technique(s) described herein is/are set forth in instructions which are stored in a machine readable storage medium and executed by one or more processors/computing devices (such as the sample computer system shown in FIG. 9) to carry out the technique(s) described herein. These and other implementations are possible. All possible implementations are within the scope of the present invention.

The apparatus 100 of FIG. 1, which includes FI unit 106, may be incorporated into a variety of devices to enable those devices to have image capturing and processing capability. These devices may include, for example, mobile communication devices (e.g. cellular phones, smart phones, etc.), personal digital assistants, audio/video capture devices (e.g. cameras, video recorders, etc.), as well as a myriad of other devices. An example of a mobile communication device in which the apparatus 100 of FIG. 1 may be incorporated is shown in FIG. 8.

Figure 8:
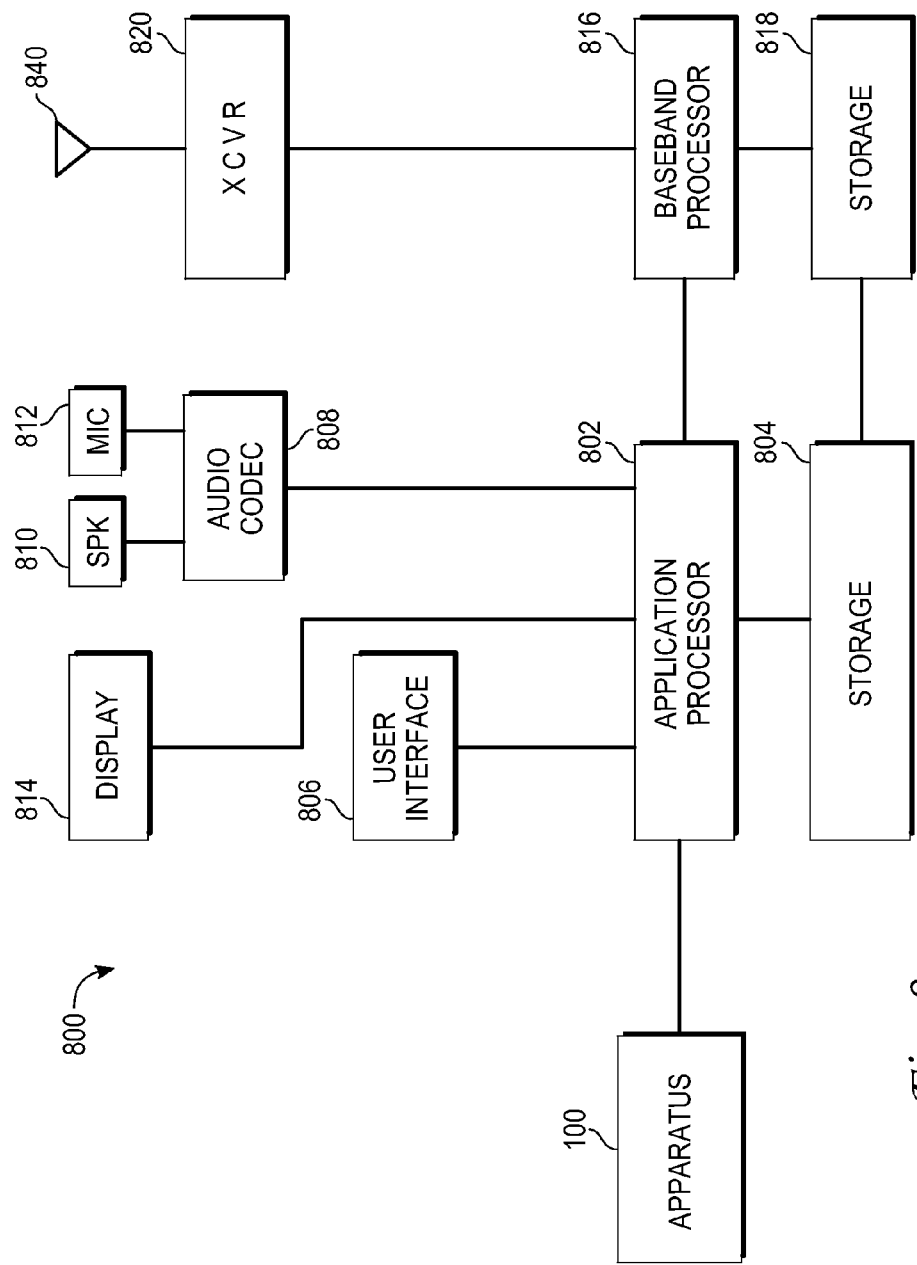
FIG. 8 is a block diagram of a sample mobile communication device in which one embodiment of the present invention may be implemented.

In addition to apparatus 100, the mobile communication device 800 of FIG. 8 further comprises an application processor 802, which is coupled to apparatus 100. The application processor 802 is further coupled to various other components, including storage 804, user interface 806, display 814, and audio codec 808. In one embodiment, it is the application processor 802 that provides most of the non-wireless communication functionality of the device 800. In performing its functions, the application processor 802 executes one or more programs (not shown) stored in storage 804. These programs may include an operating system, which is executed by application processor 802 to provide the basic functions required by the hardware and software components of the device 800. These programs may further include other programs (e.g. games, tools, social networking programs, utilities, navigation programs, browsing programs, etc.) that enable the application processor 802 to provide additional functionality. Storage 804 may store any type of program to enable the application processor 802 to provide any type of functionality. In addition to storing programs, the storage 804 may also be used by the application processor 802 to store temporary information/data that is used by the application processor 802 during program execution.

During operation, the application processor 802 interacts with the user interface 806 to receive input from a user. The user interface 806 may include, for example, a touch sensitive screen, a cursor control device, a keyboard/keypad (physical or virtual), and various other devices that allow the user to provide input. To provide visual output to the user, the application processor 802 is coupled to the display 814. Display 814 may be an LCD screen, an LED screen, or any other type of display that allows the user to view visual output in the form of text, web pages, video, etc.

The application processor 802 is also coupled to the audio codec 808 to enable the user to provide audio input to the device 800 and to enable the application processor to provide audio output to the user. The audio codec 808 receives analog audio input from the user through microphone 812 and transforms the analog audio input into digital audio signals that can be processed by the application processor 802. In addition, the codec receives digital audio signals from the application processor 802 and transforms them into analog audio signals that can be played by the speaker 810 to the user.

The application processor 802 may further be coupled to a baseband processor 816, which in turn is coupled to a second storage 818 and a transceiver 820. In one embodiment, the baseband processor 816 is responsible for performing most of the wireless communication functions of the mobile communication device 800. In doing so, the baseband processor 816 executes one or more programs (not shown) stored in the second storage 818. These programs may include an operating system (which may be the same or different operating system as that executed by the application processor 802), programs for processing incoming communication signals, program for processing outgoing communication signals, and various other programs. In addition to storing programs, the storage 818 may also be used by the baseband processor 816 to store temporary information/data that is used by the baseband processor 816 during program execution.

In processing wireless communication signals, the baseband processor 816 interacts with the transceiver 820. The transceiver 820 receives incoming wireless communication signals through antenna 840 and transforms them into digital signals that can be processed by the baseband processor 816. In addition, the transceiver 820 receives digital signals from the baseband processor 816 and transforms them into signals that can be sent out wirelessly through antenna 840.

In wireless communication device 800, the application processor 802 acts as the central interface for integrating the apparatus 100 and the baseband processor 816 with the other components in the device 800. For example, the application processor 802 receives the image information processed by the apparatus 100 and allows it to be displayed on display 814. The application processor 802 also allows the image information to be stored in storage 804. In addition, the application processor 802 receives digital communication signals from the baseband processor 816 and allows it to be sent to the speaker 810 to be played to the user. Furthermore, the application processor 802 allows audio input provided by the user through microphone 812 to be sent to the baseband processor 816 for further processing and subsequent transmission.

As noted previously, the technique(s) described herein may be implemented in whole or in part by the FI unit 106. Thus, the technique(s) may be implemented: (1) entirely by the FI unit 106; (2) partially by the FI unit 106 and partially by the application processor 802; or (3) partially by the FI unit 106, partially by the application processor 802, and partially by the baseband processor 816. These and other implementations are possible. All such implementations are within the scope of the present invention.

Sample Computing Device

Figure 9:
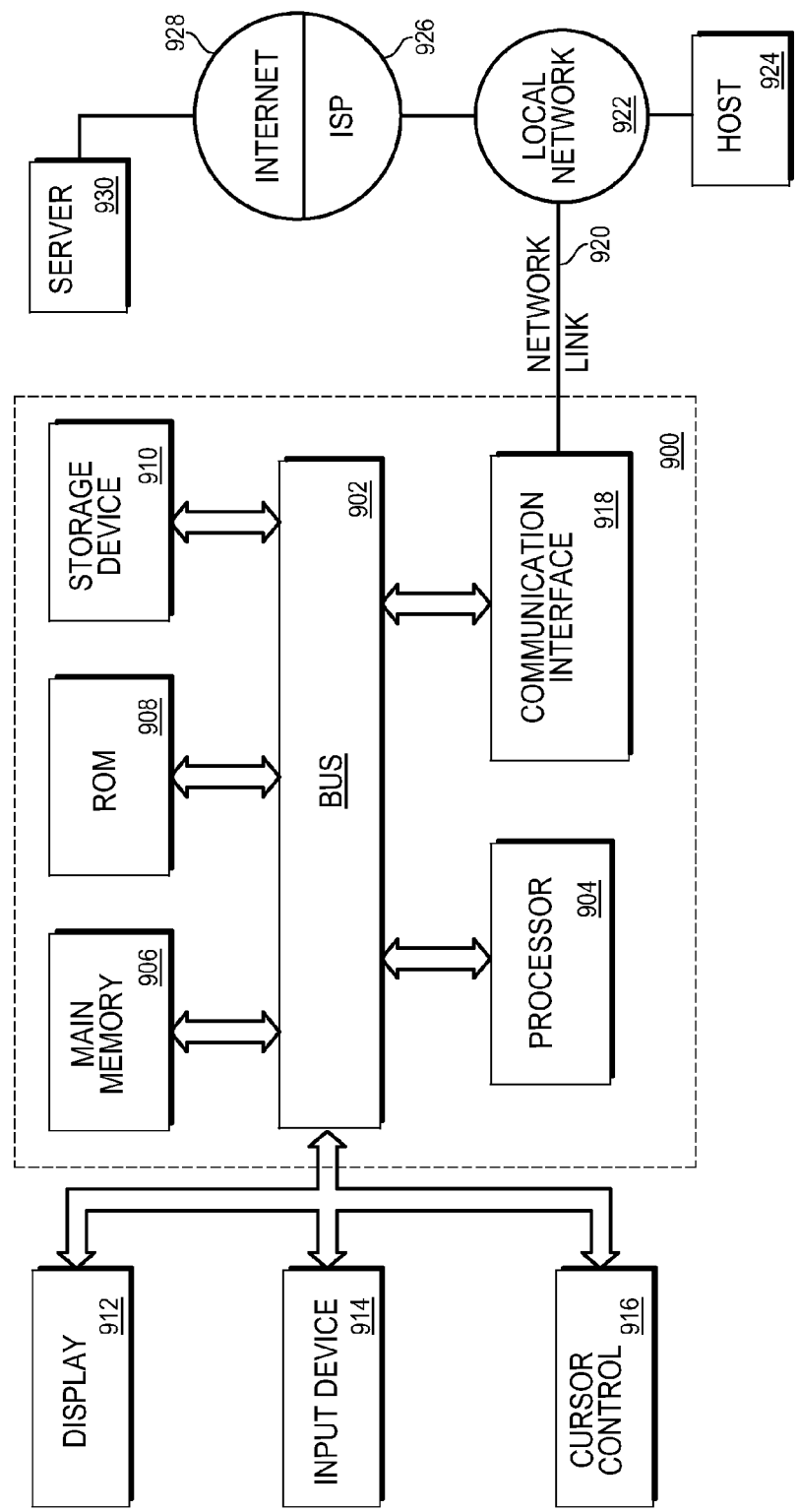
FIG. 9 is a block diagram of a sample computer system in which one embodiment of the present invention may be implemented.

FIG. 9 shows a block diagram of a computer system 900 in which a software implementation of the present invention may be implemented. Computer system 900 includes a bus 902 for facilitating information exchange, and one or more processors 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions by processor 904. Computer system 900 may further include a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912 for displaying information to a computer user. One or more input devices 914 may also be coupled to bus 902 for communicating information and input to processor 904. An input device 914 may be a keyboard/keypad having alphanumeric and other keys. An input device 914 may also be the apparatus 100 shown in FIG. 1 for providing captured/processed image information to processor 904. A cursor control device 916, such as a mouse, a trackball, or cursor direction keys may also be coupled to bus 902 for communicating direction information and command selections to processor 904 and for controlling cursor movement on display 912. This cursor control device typically has two degrees of freedom in two axes, a first axis (e.g., x) and a second axis (e.g., y), that allows the device to specify positions in a plane.

In computer system 900, bus 902 may be any mechanism and/or medium that enables information, signals, data, etc., to be exchanged between the various components. For example, bus 902 may be a set of conductors that carries electrical signals. Bus 902 may also be a wireless medium (e.g. air) that carries wireless signals between one or more of the components. Bus 902 may further be a network connection that connects one or more of the components. Any mechanism and/or medium that enables information, signals, data, etc., to be exchanged between the various components may be used as bus 902.

Bus 902 may also be a combination of these mechanisms/media. For example, processor 904 may communicate with storage device 910 wirelessly. In such a case, the bus 902, from the standpoint of processor 904 and storage device 910, would be a wireless medium, such as air. Further, processor 904 may communicate with ROM 908 capacitively. Further, processor 904 may communicate with main memory 906 via a network connection. In this case, the bus 902 would be the network connection. Further, processor 904 may communicate with display 912 via a set of conductors. In this instance, the bus 902 would be the set of conductors. Thus, depending upon how the various components communicate with each other, bus 902 may take on different forms. Bus 902, as shown in FIG. 9, functionally represents all of the mechanisms and/or media that enable information, signals, data, etc., to be exchanged between the various components.

An embodiment of the invention uses computer system 900 for implementing the technique described herein. According to one embodiment of the invention, those techniques are performed by computer system 900 in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable storage medium" as used herein refers to any storage medium that participates in providing data that causes a machine to operation in a specific fashion. In an embodiment implemented using computer system 900, various machine-readable storage media are involved, for example, in providing instructions to processor 904 for execution. Such a medium may take many forms, including but not limited to, non-volatile media and volatile media. Non-volatile media includes, for example, optical or magnetic disks, such as storage device 910. Volatile media includes dynamic memory, such as main memory 906.

Common forms of machine-readable media include, for example, a floppy disk, a flexible disk, hard disk, magnetic tape, or any other magnetic medium, a CD-ROM, DVD, or any other optical storage medium, punchcards, papertape, any other physical medium with patterns of holes, a RAM, a PROM, and EPROM, a FLASH-EPROM, any other memory chip or cartridge, or any other storage medium from which a computer can read.

Various forms of machine-readable storage media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution. In this manner, computer system 900 may obtain application code in the form of a carrier wave.

In the above description, certain process steps are set forth in a particular order, and alphabetic and alphanumeric labels may be used to identify certain steps. Unless specifically stated in the description, embodiments of the invention are not necessarily limited to any particular order of carrying out such steps. In particular, the labels are used merely for convenient identification of steps, and are not intended to specify or require a particular order of carrying out such steps.

In the foregoing specification, embodiments of the invention have been described with reference to numerous specific details that may vary from implementation to implementation. Thus, the sole and exclusive indicator of what is the invention, and is intended by the Applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A device comprising:
    a plurality of hardware elements including logic elements, wherein the hardware elements are configured to perform operations comprising:
        performing a forward mapping operation to map a specific input pixel to an output pixel, wherein the specific input pixel is one of a plurality of pixels in a first version of an image, and wherein the output pixel is one of a plurality of pixels in a second version of the image;
        selecting, based at least partially upon the output pixel to which the specific input pixel has been mapped, a set of candidate pixels, which includes one or more pixels in the second version of the image that are within proximity of the output pixel, wherein the set of candidate pixels represents one or more pixels in the second version of the image that are potentially affected by the specific input pixel;
        for each candidate pixel in the set of candidate pixels:
            performing a backward mapping operation to map the candidate pixel to a corresponding pixel in the first version of the image; and
            determining whether the corresponding pixel is the specific input pixel, wherein each candidate pixel that maps back to the specific input pixel is deemed an affected pixel; and
        deriving a pixel value for each affected pixel.

2. The device of claim 1, wherein the set of candidate pixels includes the output pixel.

3. The device of claim 1, wherein deriving a pixel value for each affected pixel comprises: for each affected pixel, deriving a pixel value for that affected pixel based at least partially upon a pixel value associated with the specific input pixel.

4. The device of claim 1, wherein deriving a pixel value for each affected pixel comprises: for each affected pixel, deriving a pixel value for that affected pixel based at least partially upon a pixel value associated with the specific input pixel, and one or more pixel values associated with one or more pixels in the first version of the image that are within proximity of the specific input pixel.

5. The device of claim 1, wherein the pixel value for each affected pixel is derived only once.

6. The device of claim 1, wherein the first version of the image is a distorted version of the image, wherein the second version of the image is an undistorted version of the image, and wherein the forward mapping operation implements a distortion removal function to determine where the specific input pixel would be located in the undistorted version of the image if distortion were substantially removed from the distorted version of the image.

7. The device of claim 6, wherein the backward mapping operation implements a distorting function to determine where each candidate pixel would be located in the distorted version of the image if distortion were added to the undistorted version of the image.

8. The device of claim 7, wherein the distortion removal function and the distorting function are inverse functions.

9. The device of claim 1, wherein the second version of the image is a zoomed version of the image having a zoom factor relative to the first version of the image, and wherein the forward mapping operation takes the zoom factor into account in mapping the specific input pixel to the output pixel.

10. The device of claim 9, wherein the backward mapping operation takes the zoom factor into account in mapping a candidate pixel to a corresponding pixel.

11. The device of claim 1, wherein the device is a mobile communication device.

12. An apparatus, comprising:
    one or more processors; and
    a storage containing instructions which, when executed by the one or more processors, cause the one or more processors to perform operations comprising:
        performing a forward mapping operation to map a specific input pixel to an output pixel, wherein the specific input pixel is one of a plurality of pixels in a first version of an image, and wherein the output pixel is one of a plurality of pixels in a second version of the image;
        selecting, based at least partially upon the output pixel to which the specific input pixel has been mapped, a set of candidate pixels, which includes one or more pixels in the second version of the image that are within proximity of the output pixel, wherein the set of candidate pixels represents one or more pixels in the second version of the image that are potentially affected by the specific input pixel;
        for each candidate pixel in the set of candidate pixels:
            performing a backward mapping operation to map the candidate pixel to a corresponding pixel in the first version of the image; and
            determining whether the corresponding pixel is the specific input pixel, wherein each candidate pixel that maps back to the specific input pixel is deemed an affected pixel; and
        deriving a pixel value for each affected pixel.

13. The apparatus of claim 12, wherein the set of candidate pixels includes the output pixel.

14. The apparatus of claim 12, wherein deriving a pixel value for each affected pixel comprises: for each affected pixel, deriving a pixel value for that affected pixel based at least partially upon a pixel value associated with the specific input pixel.

15. The apparatus of claim 12, wherein the pixel value for each affected pixel is derived only once.

16. The apparatus of claim 12, wherein the first version of the image is a distorted version of the image, wherein the second version of the image is an undistorted version of the image, and wherein the forward mapping operation implements a distortion removal function to determine where the specific input pixel would be located in the undistorted version of the image if distortion were substantially removed from the distorted version of the image.

17. The apparatus of claim 16, wherein the backward mapping operation implements a distorting function to determine where each candidate pixel would be located in the distorted version of the image if distortion were added to the undistorted version of the image.

18. A method performed by an image processing device, comprising:
    performing a forward mapping operation to map a specific input pixel to an output pixel, wherein the specific input pixel is one of a plurality of pixels in a first version of an image, and wherein the output pixel is one of a plurality of pixels in a second version of the image;
    selecting, based at least partially upon the output pixel to which the specific input pixel has been mapped, a set of candidate pixels, which includes one or more pixels in the second version of the image that are within proximity of the output pixel, wherein the set of candidate pixels represents one or more pixels in the second version of the image that are potentially affected by the specific input pixel;
    for each candidate pixel in the set of candidate pixels:
        performing a backward mapping operation to map the candidate pixel to a corresponding pixel in the first version of the image; and
        determining whether the corresponding pixel is the specific input pixel, wherein each candidate pixel that maps back to the specific input pixel is deemed an affected pixel; and
    deriving a pixel value for each affected pixel.

19. The method of claim 18, wherein the set of candidate pixels includes the output pixel.

20. The method of claim 18, wherein deriving a pixel value for each affected pixel comprises: for each affected pixel, deriving a pixel value for that affected pixel based at least partially upon a pixel value associated with the specific input pixel.

21. The method of claim 18, wherein the pixel value for each affected pixel is derived only once.

22. The method of claim 18, wherein the first version of the image is a distorted version of the image, wherein the second version of the image is an undistorted version of the image, and wherein the forward mapping operation implements a distortion removal function to determine where the specific input pixel would be located in the undistorted version of the image if distortion were substantially removed from the distorted version of the image.

23. The method of claim 22, wherein the backward mapping operation implements a distorting function to determine where each candidate pixel would be located in the distorted version of the image if distortion were added to the undistorted version of the image.

24. The device of claim 1, wherein the first version of the image is a higher resolution version of the image than the second version of the image.

25. The device of claim 1, wherein the first and second versions of the image differ in size in accordance with a scaling factor, wherein the forward mapping operation takes the scaling factor into account in mapping the specific input pixel to the output pixel, and wherein the backward mapping operation takes the scaling factor into account in mapping a candidate pixel to a corresponding pixel.

26. The device of claim 25, wherein the first version of the image is a higher resolution version of the image than the second version of the image.

27. The device of claim 10, wherein the first version of the image is a higher resolution version of the image than the second version of the image.

28. The device of claim 1, wherein the first version of the image is an undistorted version of the image, wherein the second version of the image is a distorted version of the image, wherein the forward mapping operation implements a distorting function to determine where the specific input pixel would be located in the distorted version of the image if distortion were added to the undistorted version of the image, and wherein the backward mapping operation implements a distortion removal function to determine where each candidate pixel would be located in the undistorted version of the image if distortion were substantially removed from the distorted version of the image.

29. The apparatus of claim 12, wherein deriving a pixel value for each affected pixel comprises: for each affected pixel, deriving a pixel value for that affected pixel based at least partially upon a pixel value associated with the specific input pixel, and one or more pixel values associated with one or more pixels in the first version of the image that are within proximity of the specific input pixel.

30. The apparatus of claim 12, wherein the first version of the image is an undistorted version of the image, wherein the second version of the image is a distorted version of the image, wherein the forward mapping operation implements a distorting function to determine where the specific input pixel would be located in the distorted version of the image if distortion were added to the undistorted version of the image, and wherein the backward mapping operation implements a distortion removal function to determine where each candidate pixel would be located in the undistorted version of the image if distortion were substantially removed from the distorted version of the image.

31. The apparatus of claim 12, wherein the first version of the image is a higher resolution version of the image than the second version of the image.

32. The apparatus of claim 12, wherein the second version of the image is a zoomed version of the image having a zoom factor relative to the first version of the image, wherein the forward mapping operation takes the zoom factor into account in mapping the specific input pixel to the output pixel, and wherein the backward mapping operation takes the zoom factor into account in mapping a candidate pixel to a corresponding pixel.

33. The apparatus of claim 32, wherein the first version of the image is a higher resolution version of the image than the second version of the image.

34. The apparatus of claim 12, wherein the first and second versions of the image differ in size in accordance with a scaling factor, wherein the forward mapping operation takes the scaling factor into account in mapping the specific input pixel to the output pixel, and wherein the backward mapping operation takes the scaling factor into account in mapping a candidate pixel to a corresponding pixel.

35. The apparatus of claim 34, wherein the first version of the image is a higher resolution version of the image than the second version of the image.

36. The method of claim 18, wherein deriving a pixel value for each affected pixel comprises: for each affected pixel, deriving a pixel value for that affected pixel based at least partially upon a pixel value associated with the specific input pixel, and one or more pixel values associated with one or more pixels in the first version of the image that are within proximity of the specific input pixel.

37. The method of claim 18, wherein the first version of the image is an undistorted version of the image, wherein the second version of the image is a distorted version of the image, wherein the forward mapping operation implements a distorting function to determine where the specific input pixel would be located in the distorted version of the image if distortion were added to the undistorted version of the image, and wherein the backward mapping operation implements a distortion removal function to determine where each candidate pixel would be located in the undistorted version of the image if distortion were substantially removed from the distorted version of the image.

38. The method of claim 18, wherein the first version of the image is a higher resolution version of the image than the second version of the image.

39. The method of claim 18, wherein the second version of the image is a zoomed version of the image having a zoom factor relative to the first version of the image, wherein the forward mapping operation takes the zoom factor into account in mapping the specific input pixel to the output pixel, and wherein the backward mapping operation takes the zoom factor into account in mapping a candidate pixel to a corresponding pixel.

40. The method of claim 39, wherein the first version of the image is a higher resolution version of the image than the second version of the image.

41. The method of claim 18, wherein the first and second versions of the image differ in size in accordance with a scaling factor, wherein the forward mapping operation takes the scaling factor into account in mapping the specific input pixel to the output pixel, and wherein the backward mapping operation takes the scaling factor into account in mapping a candidate pixel to a corresponding pixel.

42. The method of claim 41, wherein the first version of the image is a higher resolution version of the image than the second version of the image.

\* \* \* \* \*